July 5, 1938.  A. LEO  2,122,982
METHOD AND APPARATUS FOR MOLDING JELLY PRODUCTS
Original Filed Oct. 25, 1935    2 Sheets-Sheet 1
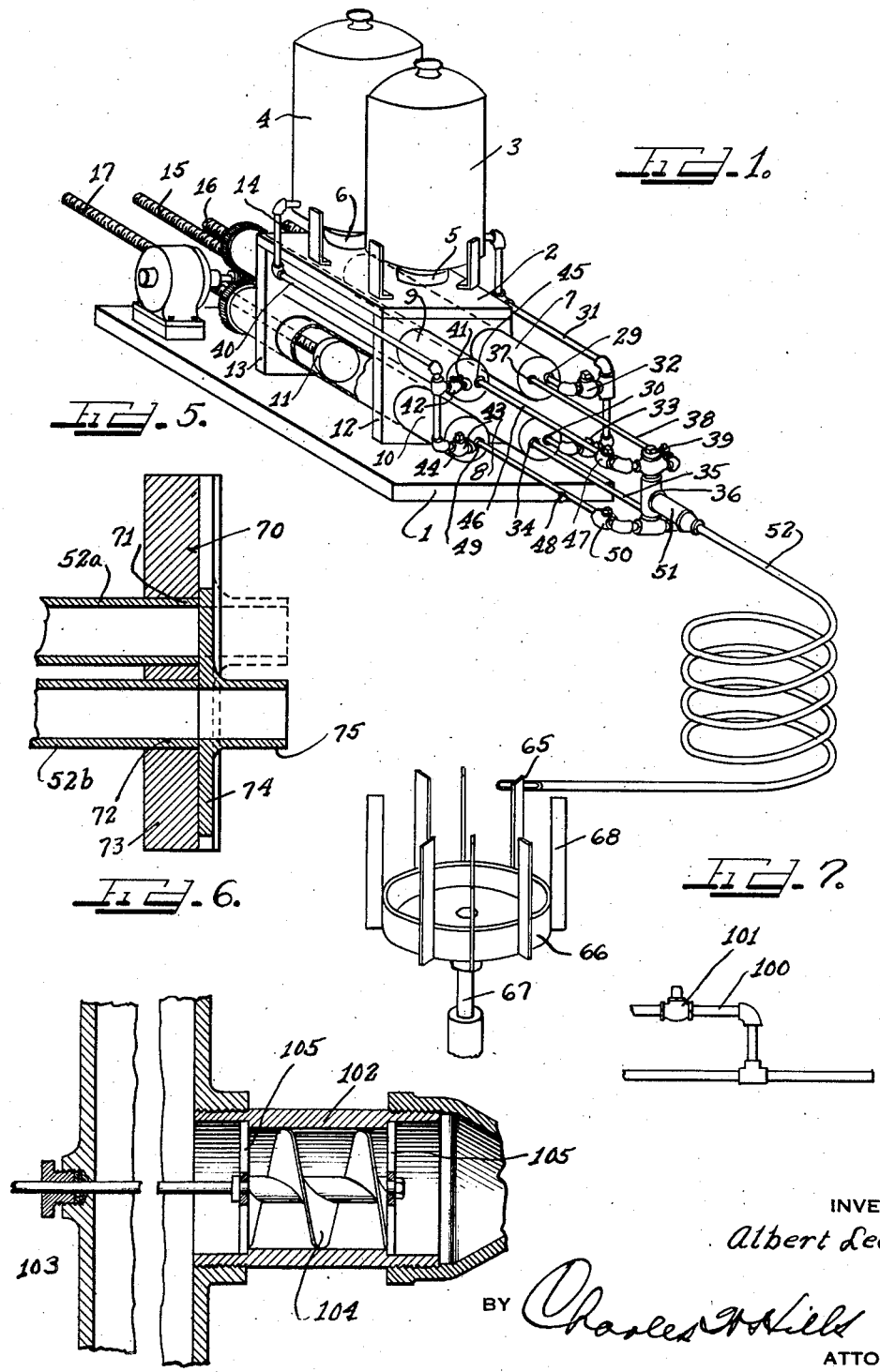
INVENTOR.
Albert Leo.
BY Charles H. Hills
ATTORNEY.

July 5, 1938.   A. LEO   2,122,982
METHOD AND APPARATUS FOR MOLDING JELLY PRODUCTS
Original Filed Oct. 25, 1935   2 Sheets-Sheet 2
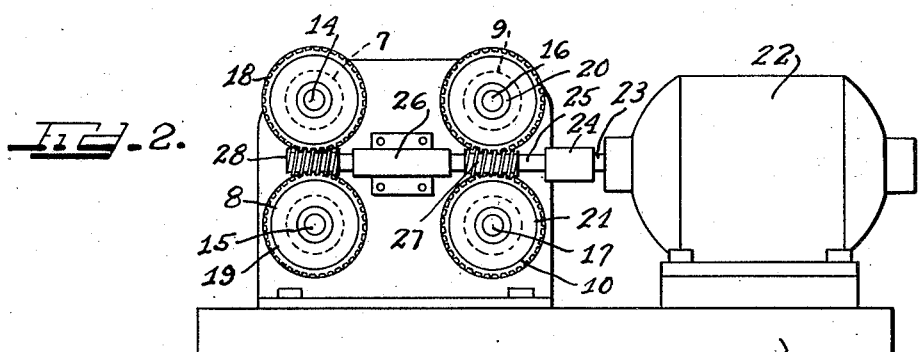
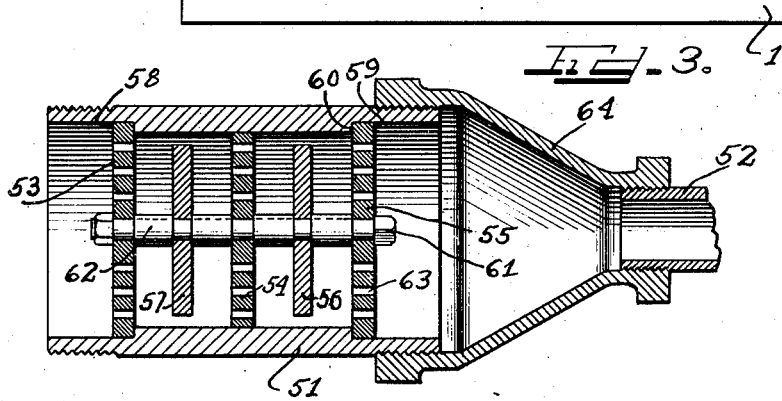
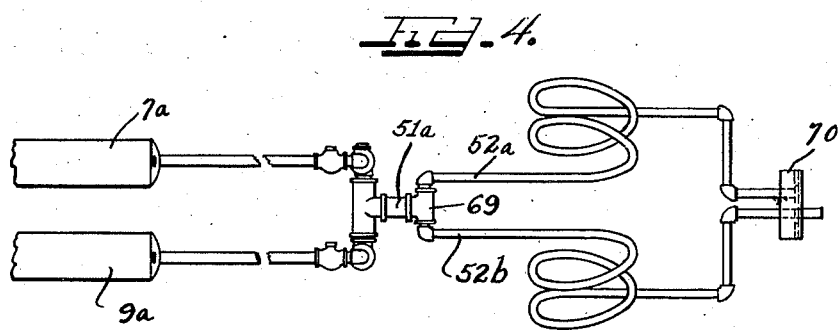
INVENTOR.
Albert Leo.
BY
ATTORNEY.

Patented July 5, 1938

2,122,982

UNITED STATES PATENT OFFICE 2,122,982

METHOD AND APPARATUS FOR MOLDING JELLY PRODUCTS

Albert Leo, deceased, late of Ontario, Calif., by Mary Beck Leo, administratrix, Ontario, Calif.

Substitute for abandoned application Serial No. 46,693, October 25, 1935. This application July 6, 1937, Serial No. 152,149

9 Claims. (Cl. 99—132)

This invention relates to jelly products such as jellied candies and similar confections and has particular reference to a method of molding jellies into desired shapes during the process of forming the jelly material, and to apparatus for carrying out such method.

The present application is filed as a substitute for the Albert Leo application entitled "Method and apparatus for molding jelly products", Serial No. 46,693, filed October 25, 1935, now abandoned.

Heretofore the practice in making jellies and jelled confections has consisted essentially in mixing together the various ingredients of which the jellies or jelled confections are to be made, and maintaining the materials at a relatively high temperature to prevent the setting of the jelly until the materials could be placed in the desired molds. The molding of the jelly consisted either in the placing of the jelly materials in a relatively large vessel, permitting the same to set, and then cutting from the slab or block of jelled material so formed the desired shapes for the finished confections, or the liquid jelly mixture was placed in starch molds, which molds, with the jelly mixture therein, was then stored for a predetermined length of time to insure the setting or solidification of the jelly and the drying out of the jelly to such degree as would permit the molded confections to retain their shape.

The first of these methods has the disadvantage that all of the material mixed up must be formed into jelly within a predetermined length of time, else the jelly material will set prior to its introduction into the molding vessel, thereby making it essential that only such amounts of jelly material as can be handled within a predetermined length of time can be mixed at any one time. The other method, likewise, requires that the mixture must be placed in the molds within a predetermined length of time after the mixing of the ingredients and then further requires the space necessary for the storage of the materials over a relatively long period of time during the setting and drying operations.

There is devised a method of molding jellies into desired shapes by a substantially continuous process in which the jelly ingredients are passed into an elongated confined space and moved therethrough during the time the jelly is setting, or solidifying; the jelled material issuing from the farther end of the space in the form of a continuous rod of jelled material, having a cross sectional shape corresponding to the interior cross section of the molding space whereby the rod of jelled material may be cut into sections as it issues from this molding conveyer.

Therefore, an object of this invention is to provide a method of molding jellies in which the jelly mixture is introduced into one end of a relatively long tubular mold under such pressure as will cause the jelly material to move through the length of the mold at such speed as will permit the jelly material to solidify within the tubular mold and issue from the opposite end thereof as solidified jelly confections.

Another object of the invention is to provide a method of making molded jelly material in which the jelly material is introduced into an elongated tubular mold and forced through the mold under pressure sufficient to eject the jelled material from the opposite end of the mold.

Another object of the present invention is to provide a method of forming jellied products in which the ingredients for forming the jelly include pectin or similar fruit gums capable of reaction with acid or a similar reactive agent to convert the pectin mixture into jelly, and wherein the pectin mixture is maintained separate from the acid mixture until the materials are to be introduced immediately into the mold.

The method and apparatus of the invention is also generally applicable to use with other gelatinizing agents such as gelatin starch and the like admixed with proper ingredients to form the desired jelled mass.

Another object of the invention is to provide a molding apparatus for molding jellied materials, wherein an elongated tubular mold is employed, the jelly material being introduced into one end of the mold and allowed to cool and set within the mold with mechanism for forcing the jelly material through the mold to eject the said jelly from the opposite end of the mold.

Another object of the invention is to provide apparatus for molding jelly products as set forth in the preceding paragraph wherein the acid mixture and the pectin mixture may be received as separate mixtures and pumped into the mold in such proportions as to supply the correct quantity of pectin material and the correct quantity of acid material to form the entire mixture into a jelly during its passage through the molding tube.

The invention utilizes the tendency of a jelly to contract and lose surface tension upon jellification, thus permitting ready passage of the jelled material through the molding tube to the point of discharge therefrom.

Other objects and advantages will be apparent from a study of the following specifications, read in connection with the accompanying drawings, wherein—

Figure 1 is a perspective view of one form of molding apparatus which may be employed in the practice of the invention.

Figure 2 is a detail end view of the pump apparatus employed to force the jelly material through the mold.

Figure 3 is a detail sectional view of the mixer employed to intimately mix the acid materials and the pectin materials immediately prior to their introduction into the mold.

Figure 4 is a diagrammatic view of a modified form of apparatus which may be employed in the practice of the invention.

Figure 5 is a detail sectional view of a valve which may be employed with that form of apparatus illustrated in Figure 4.

Figure 6 is a sectional view of a modified form of mixer particularly adapted for use with products such as jam containing fruit pulp.

Figure 7 is a fragmentary detail showing the relief valve and by-pass arrangement.

Before entering into a detailed description of the apparatus illustrated in the drawings, attention is called to the fact that, as will be understood by those skilled in the art of making jellies, fruit pectins and similar products when introduced into sugar solutions will react with acids present therein or added thereto to form solidified jelly-like products which will retain their shape at ordinary atmospheric tempertures and conditions.

The most common method of commercial manufacture of jellies is to employ sugar syrups into which is introduced the desired flavoring and coloring material, a sufficient quantity of fruit pectin being added to the syrup together with a sufficient quantity of acids or similar reactive agents to cause the entire mixture to jell. The rapidity with which the jelling reaction takes place depends upon the intimate mixture of the pectin and acid throughout the mixture and upon the temperature at which the mixture is maintained, a high temperature acting to retard the jelling operations for a considerable period of time, while reduction in temperature causes the jelling reaction to take place more rapidly.

It is well known that when the temperature of a non-jellifying syrup is reduced, the syrup becomes more viscous, and even though the lowered tempertature may cause a slight reduction in volume, the flow is hampered by the increased viscosity, and by the increased surface tension or adhesion to the walls of the container incident to such lowered temperature. However, a mixture that has the capacity of jellifying, such as a syrup, pectin and acid mixture, not only shrinks in volume upon jellification but also loses much of its adhesive properties and moves freely. There are utilized these characteristics in the practice of the invention by providing a relatively long tubular mold in one end of which there is introduced the relatively viscous liquid mixture under such pressure as is necessary to move this liquid through the tubular mold. As the jelling action takes place, the jellied material shrinks from the interior walls of the mold, permitting the jellied material to be readily ejected from the mold. In fact, the jellied material appears to be somewhat self-lubricating so that relatively little pressure is required to move a long rod or stream of the jellied material through a relatively long length of molding tube. Thus by making the molding tube of sufficient length to permit the jelling reaction to take place during the passage of the jelly material through the mold, as by making the mold of sufficient length to permit cooling of the material below the jelling temperature or by employing refrigerants or cooling apparatus to chill the mold, a stream of ingredients to be jelled may be introduced into one end of a mold while a stream or rod of jellied material issues from the opposite end of the molding tube.

It will therefore be understood by those skilled in this art that there may be employed such molding tube, introducing a complete syrup-pectin-acid mixture into one end of the tube and eject the jellied material from the opposite end of the tube, maintaining the jelly materials in liquid form by maintaining the same at a relatively high temperature prior to its introduction into the mold to thus retard the jelling action until after the material has started its passage through the mold.

On the other hand, the materials initially may be mixed, preferably in two separated containers, one containing a syrup, flavoring, coloring and pectin mixture, while the other contains the acid or reactive agent necessary to perform the jelling reaction with the pectin and syrup, introducing the material from the two containers into the molding tube in such proportions that the jelling action takes place during the passage of the materials through the molding tube. Again the syrup mixtures may be separated, placing the pectin, flavoring and coloring mixture in one of the syrup mixtures, and placing the acid or reactive agent in the other syrup, so proportioning the two separate syrups as to permit equal quantities of the two syrups to be simultaneously introduced into the molding tube to cause the jelling reaction to take place during the passage of the mixture through the molding tube.

By either of the latter two methods the molding may be continuous throughout as long a period as is desired, but should any interruption in the process be required, those materials which have not been introduced into the molds may be retained for relatively long periods of time without jelling of the materials taking place, it being possible to form the jelly only after the two separated materials have been joined together.

The latter method is employed herein as the preferred method, and the apparatus illustrated in the drawings is designed for carrying out this latter method, although, as will be hereinafter described, slight modifications in this apparatus readily adapts it for the employment of either of the other two methods set forth.

Referring to the drawings, there has been illustrated in Figure 1 a suitable table or supporting surface 1 upon which pumping apparatus and tanks may be mounted as by forming a shelf 2 spaced above the table 1 to act as a support for a pair of tanks or containers 3 and 4. The tank 3 may be employed as a reservoir for one of the solutions or mixtures required for the formation of the jelly, this tank preferably containing that portion of the mixture which includes the pectin, or similar product, while tank or container 4 is employed as a reservoir for the complementary solution or mixture containing the acid or other reactive agent required to react with the pectin in the tank 3. Suitable heaters 5 and 6, illustrated as burners, may be employed to maintain the solution in the tanks 3 and 4, respectively, at the desired temperatures.

As an example of the solution which may be employed, it is preferred to use a solution in tank 3 consisting, approximately, of a 42% sugar solution, to which has been added the desired flavoring or coloring material, and a sufficient quantity of pectin or similar product to react with the solution in tank 4 to form a complete jelly of the entire mixture. The solution or syrup in tank 3 will be referred to as the "P" solution. The solution in tank 4 it is preferred to make approximately 72% sugar solution to which has been added a sufficient acid or other reactive agent to act upon the pectin solution "P" to form a complete jelly. This acid solution will be designated as the "A" solution.

It will be understood by those skilled in this art that fruit juice, ground fruit or similar materials may be added to the "P" solution, if desired, neutralizing the effect of any of the fruit acids by the introduction in that solution of a suitable alkaline material to prevent acid reaction with the pectin or similar material contained in the "P" solution.

Immediately below the shelf 2, there has been illustrated a plurality of pump cylinders 7, 8, 9 and 10 which may be of any desired size or shape, though it is preferred that the same be of relatively small cross section and of relatively great length, such as cylindrical tanks of approximately six inches in diameter and approximately three feet in length. Each of the cylinders 7, 8, 9 and 10 has a piston 11 reciprocable therein.

The cylinders may be secured rigidly in place in any desired manner, though the same are illustrated herein as being secured to two upright plates 12 and 13, spaced from each other along the length of the table 1. If desired, the uprights 12 and 13 may constitute the supports for the shelf 2. As a convenient means of mounting and reciprocating the pistons in the long cylinders, each of the pistons is mounted upon a long screw shaft, that associated cylinder 7 being designated by the reference character 14; that for cylinder 8 by the reference character 15; that for cylinder 9 by the reference character 16; and that for cylinder 10 by the reference character 17.

By referring particularly to Figures 1 and 2, it will be observed that a relatively large wormwheel is rotatably mounted upon the rear end of each of the cylinders, that for cylinder 7 being designated by the reference character 18; that for cylinder 8 being designated by the reference character 19; that for cylinder 9 by the reference character 20; and that for cylinder 10 being designated by the reference character 21. Each of the wormwheels is provided with internal threads engaging the threads of the screwshaft with which it is associated so that rotation of any of the wormwheels causes movement of the screwshaft inwardly or outwardly of its associated cylinder, depending upon the direction in which the wormwheel is turned.

As a convenient means for operating the wormwheels, there is illustrated a motor 22 of the variable speed type mounted upon the table 1 and having its shaft 23 coupled as at 24 to a wormshaft 25, suitably supported in a bearing 26. The location of the cylinders relative to each other is such that the wormwheels for cylinders 9 and 10 may simultaneously engage upon opposite sides of a worm 27 mounted upon the shaft 25, while similarly the wormwheels for cylinders 7 and 8 engage upon opposite sides of a second worm 28 also mounted upon shaft 25. Thus rotation of the motor shaft 23 in one direction will cause the screw shafts 14 and 16 to move inwardly of their cylinders 7 and 9, while at the same time the screw shafts 15 and 17 for cylinders 8 and 10 will be moved outwardly. Reversal of the motor 22 will cause the screwshafts 15 and 17 to move inwardly of their cylinders and shafts 14 and 16 to move outwardly of their cylinders.

By referring particularly to Figure 1, it will be observed that the solution "P" from tank 3 is passed to the intake ports 29 and 30 of cylinders 7 and 8, respectively, by means of suitable piping 31, a check valve 32 being interposed in the pipe line immediately adjacent the intake port 29 for cylinder 7, while a similar check valve 33 is interposed immediately in advance of the intake port 30 for cylinder 8. Thus upon the outward movement of the screw shaft 14 and the retraction of its piston, the cylinder 7 will be filled with the "P" solution while the "P" solution which had previously been drawn into the cylinder 8 will be ejected therefrom. The exhaust port 34 of cylinder 8 is connected by means of piping 35 through a suitable check valve, not shown, to a T-joint 36, while the exhaust port 37 of cylinder 7 is similarly connected through a pipe 38 and check valve 39 to the T-joint 36.

The "A" solution from tank 4 may be fed through a pipe 40 to the intake port 41 of cylinder 9, a suitable check valve 42 being interposed in this line, and also to the intake port 43 of cylinder 10, a similar check valve 44 being interposed in this line, and also to the intake port 43 of cylinder 10, a similar check valve 44 being interposed in this line. Thus upon retraction of the piston in cylinders 9 and 10, these cylinders will be filled with liquid from tank 4 and upon forward movement of the pistons such liquid will be ejected from the cylinders. The exhaust port 45 for cylinder 9 is connected through a pipe 46 and check valve 47 to the T-joint 36, a similar pipe 48 connecting exhaust port 49 for cylinder 10 with the T-joint 36, a check valve 50 being interposed in this line.

With the apparatus thus far described, it will be apparent that upon retraction of the screwshafts 14 and 16, cylinders 7 and 9 will be filled with the "A" and "P" liquids, respectively, while at the same time the "A" and "P" liquids contained in the cylinders 8 and 10 will be ejected simultaneously to the T-joint 36.

Since the two solutions "A" and "P" have been selected such that equal quantities of the two liquids when mixed together will bring into contact the necessary proportions of the pectin, sugar and the acid to form the entire mixture into jelly, the cylinders 7 and 9 may be of equal volume and also the cylinders 8 and 10 may be of equal volume so that upon each forward movement of the pistons in cylinders 7—9 or 8—10 equal quantities of the two solutions will be simultaneously forced through the T-joint 36.

If desired, each of the pressure pipes leading to the T-joint 36 may have connected therein a return by-pass pipe 100 provided with a proper relief valve 101 and leading back to the proper supply tank so that if the mixer becomes clogged, the relief valves will open at a predetermined pressure and the materials will be by-passed back to the tanks without damage to the apparatus. This permits of intermittent discharge of the jelly and insures a uniform end pressure.

The T-joint 36 is connected to a short nipple 51, constituting the mixer for the two solutions, to which is connected a long tube 52 constituting the mold or molding tube in which the jelling action of the materials takes place.

While the nipple or mixer 51 may be of any desired construction, it is preferred to employ as the mixer some mechanical arrangement which will cause turbulence within the solutions introduced therein to insure the intermittent dispersion of the acid syrup "A" throughout the pectin syrup "P".

As is illustrated particularly in Figure 3, the nipple 51 may be provided with a plurality of baffles 53, 54, 55, 56, and 57 secured in place within the nipple 51 in any desired manner. As is illustrated herein, the baffles 53 and 55 are of slightly greater diameter than the internal diameter of the nipple 51, the nipple being counterbored at 58 and 59 to form shoulders 60 against which these discs or baffles may abut. A bolt 61 may be passed through the center of the baffles 53 and 55 to constitute a mounting means upon which may be assembled the baffles 54, 56 and 57, these baffles being suitably spaced apart by means of sleeves 62. It is preferred that the baffles 53 and 54 extend throughout the internal cross sectional area of the nipple 51 and have therein a plurality of small holes 63 through which the mixture of the two liquid or syrups may pass, while baffles 56 and 57 are of preferably smaller diameter than the interior of the nipple requiring that the mixed liquids pass around the same, thus insuring intimate mixing and dispersion of the two liquids one within the other. A reduction coupling 64 may be employed if it is desired to connect the nipple 51 with a tubular mold 52 of lesser diameter.

The baffles in mixer 51 automatically and continuously effect a mixture of the ingredients by virtue of the fact that the same are introduced into the mixer under pressure. However, when fruit pulp is incorporated with the syrups, as in making jam, it may be necessary to employ a spiral conveyer type of mixer such as shown in Figure 6, whereon the reference numeral 102 designates the mixer casing, 103 the power driven mixer shaft, 104 the spiral type conveyor mixer on said shaft and whereon 105 designates suitable spider supports for said shaft within the casing.

The tubular mold 52 consists of a long length of tubing which may extend in a straight line where space permits or may be bent into a series of coils, helices, or convolutions if lack of space requires. Also, the tubular mold may be of any desired cross sectional shape for the purpose of producing predetermined cross sectional shape of the final molded jelly products. For example, if the tube is circular, the rod or stream of jelly ejected from the exit end thereof will be of circular cross section, while square, rectangular, triangular, star-shaped, or other shapes of cross sections of the tubular mold 52 will produce similar cross sections in the finished rod or stream of jellied material. A length of tubing of approximately 50 feet may be employed with a speed of operation of the pump cylinders described herein of approximately one inch per minute, to produce a continuous stream of elastic jelly at the exit end of the tubular mold, the continuous stream being accomplished by employing the two cylinders 7 and 8 for the "P" liquid, one discharging while the other is filling, and similarly employing two cylinders 9 and 10 for the "A" liquid, one discharging while the other is filling.

The length of the tube 52 and the speed of operation of the pumps may be varied to fit the occasion. If a shorter tube is desired or a more rapid operation of the pumps is desired, the tubular mold 52 may be passed through brine tanks or other refrigerant apparatus which will artificially cool the tubular mold and cause the jelly to set more quickly while, if the atmospheric temperatures to which the tubular tube 52 is exposed is relatively high, a greater length of tube may be employed or a slower speed of operation of the pumps may be employed.

If it is desired to employ the method hereinbefore described of mixing all of the syrup, pectin, fruit juice, flavoring, coloring, etc., together in one tank and to merely employ a solution of acid in the other tank, it will be apparent that the only change which will be required will be in the size or stroke of the cylinders 7 and 8 relative to the size and stroke of the cylinders 9 and 10 so as to proportion the quantities of liquids pumped upon each stroke to the desired values necessary to carry out the complete jelly reaction.

On the other hand, if it is desired to mix all of the products together in one tank and pump them together into the molding tube 52, it will only be necessary to employ one pair of pump cylinders, one having a forward stroke during the time the other is returning. In any of these forms of devices, the process will be continuous so long as a continuous stream of material is fed into the molding tube 52.

Under some circumstances, it may be desirable to employ a pump that operates intermittently, thus causing an intermittent flow of jelly.

The stream of molded material issuing from the exit end of the tubular mold 52 may be cut into sections in any desired manner, one form of cutting device illustrated in Figure 1 including a pan 66 rotatably mounted upon suitable bearings 67 and having a plurality of knives 68 mounted upon the pan 66. The pan is mounted tangentially to the exit end 65 of the molding tube 52 so that as the stream of jelly material issues from the molding tube, it will engage one of the knives and move the knife and pan about its axis, thereby pressing the knife inwardly crosswise of the stream of molded material. For this purpose, the end 65 of the molding tube 52 may be beveled off, as indicated in Figure 1. The material will fall into the pan 66 as it is cut, and may be removed therefrom in any desired manner. Thus it will be observed that the forward motion of the molded material acts as a motive power for the cutting mechanism 66—68.

In the form of the device shown in Figure 4, there are employed two molding tubes 52ª and 52ᵇ, each of which connects with the T-joint 69 coupled directly to the mixer 51ª into which material from cylinders 7ª and 9ª may be pumped. Each of the molding tubes 52ª and 52ᵇ may be made of any desired length arranged in a helix or other shape and terminating in a two-way valve 70.

By referring particularly to Figure 5, it will be observed that the exit end 71 of the tubular mold 52ª and the exit end 72 of the tubular mold 52ᵇ are brought together in a valve body member 72, which member is provided with a slide valve 74 having a spout 75 which may be moved from the full line position shown in Figure 5 aligned with tubular mold 52ᵇ to a position illustrated in dotted lines, wherein the spout 75 is aligned with the mold 52a.

The operation of the pumps 7a and 9a will fill the tubular molds 52a and 52b, the valve 74 being moved into alignment with the exit end of the tubular mold 52a and further pressure exerted by the pumps 7a—9a will cause the jelly material in tubular mold 52a to be extruded, while that material which is in the mold 52b will remain dormant during the entire time required for the ejection of the jellied material from mold 52a. Then the valve 74 may be moved into alignment with the exit end of mold 52b, and the jellied material removed therefrom, while the material in mold 52a remains dormant. In this manner, a substantially continuous supply of jellied material may be extruded from the spout 75 while allowing ample time for the jelly material to solidify without the necessity of providing an extreme length of tubular mold and without the necessity of applying artificial cooling thereto.

It will therefore be observed that there is provided a method of making jelly or jellied confections in which the material issues as a solidified molded jelly and in which the process may be continuous or intermittent, as desired.

By increasing the pectin content in the proper proportion, it is possible to make a jelly with a relatively low sugar content. This is particularly desirable where a candy containing more fruit juice, fruit pulp or ground fruit is desired.

Inasmuch as the jellied material may be combined with other products, it is desirable that the driving motor be of the variable speed type so that the flow of jelly may be synchronized with the supply of other products with which it is to be combined.

While there is illustrated and described herein slow-acting positive displacement piston type pumps, it will be understood by those skilled in the art that any form of pump in which the volume pumped thereby may be accurately controlled may be adapted to the practice of the invention; also, it will be apparent that where space conditions permit, the invention may be practiced by a gravity feed from the tanks 3 and 4, wherein sufficient pressure is created by gravity to extrude the jellied material from the exit end of the molding tube.

Although there is specifically referred herein to a syrup, pectin and acid mixture, it should be understood that the method and apparatus of this invention are generally applicable for use with jellifying agents such as gelatin starches and gums which set without acid.

It is therefore not desired to be limited to any of the details illustrated and described herein, except as defined in the appended claims.

What is claimed as the invention is:

1. The method of making jelly products which consists in mixing together a solution of syrup with a sufficient quantity of pectin and acid to jell the mixture, and passing a continuous stream of said mixture through an elongated confined space, cooling said mixture during its passage through said space to cause said mixture to jell prior to its exit therefrom.

2. The method of making jelly products which consists in making separate solutions, one containing syrup and pectin and the other containing acid, the proportions of said pectin and acid being such as to jell the sum of said solutions, continuously mixing said solutions together, and immediately passing a continuous stream of the mixture through an elongated confined space, the length of which and rate of flow through which is sufficient to permit jelling of said mixture prior to its exit therefrom.

3. The method of making jelly products, which consists in making two separate solutions, one containing syrup and pectin and the other containing syrup and acid, the proportions of each of the solutions being such that equal volumes of the two solutions when mixed will contain sufficient pectin and acid to jell the mixture, continuously mixing equal volumes of said two solutions, and immediately and continuously passing said mixture through an elongated confined space, the length of which and rate of flow through which is sufficient to permit jelling of said mixture prior to its exit therefrom.

4. In an apparatus for making jelly products, an elongated mold, means at one end of said mold for receiving a mixture of syrup and acid and pectin in sufficient quantities to jell the mixture, and means for continuously forcing said mixture through said mold, said mold having sufficient length and said means for forcing said mixture through said mold producing a rate of flow through said mold necessary to jell said mixture prior to its exit from said mold.

5. In an apparatus for continuously forming jelly products, an elongated tubular mold, means at one end of said mold for introducing into said mold a mixture of syrup, acid and pectin in proportions sufficient to jell the mixture, pump means for continuously pumping said mixture into said mold, a variable speed drive for said pump means, said mold having a sufficient length and said pump means producing a rate of flow through said mold sufficient to permit jelling of said mixture prior to its extrusion from the other end of said mold.

6. In an apparatus for forming jelly products a pair of containers, one for receiving a solution of syrup and a sufficient quantity of pectin to form a jelly therewith, the other for containing a solution of acid in sufficient quantity to react with said first named solution to jell the mixture, an elongated tubular mold, pump means for each of said solutions for continuously pumping said solutions into one end of said mold in such proportions of each of said solutions as to introduce into said mold a volume of said first solution with a volume of said second solution necessary to carry out the jelling reaction with the volume of said first solution, means at the entrance of said tubular mold for intimately mixing said two solutions during their continuous passage therethrough, the length of said tubular mold and the rate of flow from said pumps being sufficient to permit jelling of said mixture within said mold prior to its extrusion from the exit end thereof.

7. In an apparatus for forming jelly products, a pair of containers, one for receiving a solution of syrup and a sufficient quantity of pectin to form a jelly therewith, the other for containing a solution of acid in sufficient quantity to react with said first named solution to jell the mixture, an elongated tubular mold, pump means for each of said solutions for continuously pumping said solutions into one end of said mold in such proportions of each of said solutions as to introduce into said mold a volume of said first solution with a volume of said second solution necessary to carry out the jelling reaction with the volume of said first solution, means at the entrance of said tubular mold for intimately mixing said two solutions, the length of said tubular mold and the rate of flow from said pumps being sufficient to permit jelling of said mixture within said mold prior to its extrusion from the exit end thereof.

8. The method of making jelly products which consists in mixing together a solution of syrup with a sufficient quantity of pectin and acid to jell the mixture, passing a continuous stream of said mixture through an elongated confined space, the length of which and rate of flow through which is sufficient to cool the mixture to jellied consistency prior to its exit therefrom, and slicing said stream of jelly as it issues from said space.

9. In an apparatus for continuously forming jelly products, an elongated tubular mold, means at one end of said mold for introducing into said mold a mixture of syrup, acid and pectin in proportions sufficient to jell the mixture, pump means for continuously pumping said mixture into said mold, said mold having a sufficient length, said pump means producing a rate of flow through said mold sufficient to permit jelling of said mixture prior to its extrusion from the other end of said mold, and a cutter at the extrusion end of said mold for engaging and slicing said extruded jelly as it issues from said mold.

MARY BECK LEO,
*Administratrix of the Estate of Albert. Leo, Deceased.*